(12) United States Patent
Shrewsbury (10) Patent No.: US 10,875,441 B2
(45) Date of Patent: Dec. 29, 2020

(54) RATCHETING STRAP STORAGE ASSEMBLY

(71) Applicant: Lionel Shrewsbury, Camp Creek, WV (US)

(72) Inventor: Lionel Shrewsbury, Camp Creek, WV (US)

( * ) Notice: Subject to any disclaimer, the term of this patent is extended or adjusted under 35 U.S.C. 154(b) by 2 days.

(21) Appl. No.: 16/253,981

(22) Filed: Jan. 22, 2019

(65) Prior Publication Data

US 2020/0231083 A1    Jul. 23, 2020

(51) Int. Cl.
| | | |
|---|---|---|
| *B60P 7/00* | (2006.01) | |
| *B60P 7/08* | (2006.01) | |
| *B65D 85/675* | (2006.01) | |
| *B65H 75/36* | (2006.01) | |

(52) U.S. Cl.
CPC .......... *B60P 7/0846* (2013.01); *B65D 85/675* (2013.01); *B65H 75/364* (2013.01); *B60P 7/083* (2013.01)

(58) Field of Classification Search
CPC ...... B60P 7/083; B60P 7/0846; B65H 75/364; B65D 85/675
See application file for complete search history.

(56) References Cited

U.S. PATENT DOCUMENTS

| | | | | |
|---|---|---|---|---|
| 3,948,455 A | * | 4/1976 | Schwartz | B65D 83/0847 |
| | | | | 242/594.2 |
| 6,612,436 B1 | * | 9/2003 | Zullo | B65D 51/28 |
| | | | | 206/391 |
| 7,681,286 B1 | | 3/2010 | Lewis | |
| 8,376,674 B1 | | 2/2013 | Davis, III | |
| 8,973,783 B2 | * | 3/2015 | Clouser | B65C 11/00 |
| | | | | 221/286 |
| 9,796,341 B1 | * | 10/2017 | Anderson | B60P 7/0846 |
| 9,925,911 B2 | * | 3/2018 | Hitsman | B65H 54/585 |
| 2002/0030133 A1 | | 3/2002 | Ratzlaff | |
| 2005/0145747 A1 | | 7/2005 | Breeden, III | |
| 2017/0113597 A1 | | 4/2017 | Hitsman | |

* cited by examiner

*Primary Examiner* — Sang K Kim (57) ABSTRACT

A ratcheting strap storage assembly for includes a box that has a first compartment and a second compartment. The first compartment contains a ratcheting mechanism of a ratcheting strap for storage. The second compartment contains a strap of the ratcheting strap being coiled therein for storage. A winding mechanism is rotatably coupled to the box and the strap of the ratcheting strap is coupled to the winding mechanism. The winding mechanism wraps the strap therearound when the winding mechanism is rotated in a winding direction to coil the strap within the second compartment for storage. The winding mechanism unwinds the strap when the winding mechanism is rotated in the unwinding direction to release the strap from the box.

11 Claims, 6 Drawing Sheets

RATCHETING STRAP STORAGE ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to storage devices and more particularly pertains to a new storage device for storing a ratcheting strap.

BRIEF SUMMARY OF THE INVENTION

An embodiment of the disclosure meets the needs presented above by generally comprising a box that has a first compartment and a second compartment. The first compartment contains a ratcheting mechanism of a ratcheting strap for storage. The second compartment contains a strap of the ratcheting strap being coiled therein for storage. A winding mechanism is rotatably coupled to the box and the strap of the ratcheting strap is coupled to the winding mechanism. The winding mechanism wraps the strap therearound when the winding mechanism is rotated in a winding direction to coil the strap within the second compartment for storage. The winding mechanism unwinds the strap when the winding mechanism is rotated in the unwinding direction to release the strap from the box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
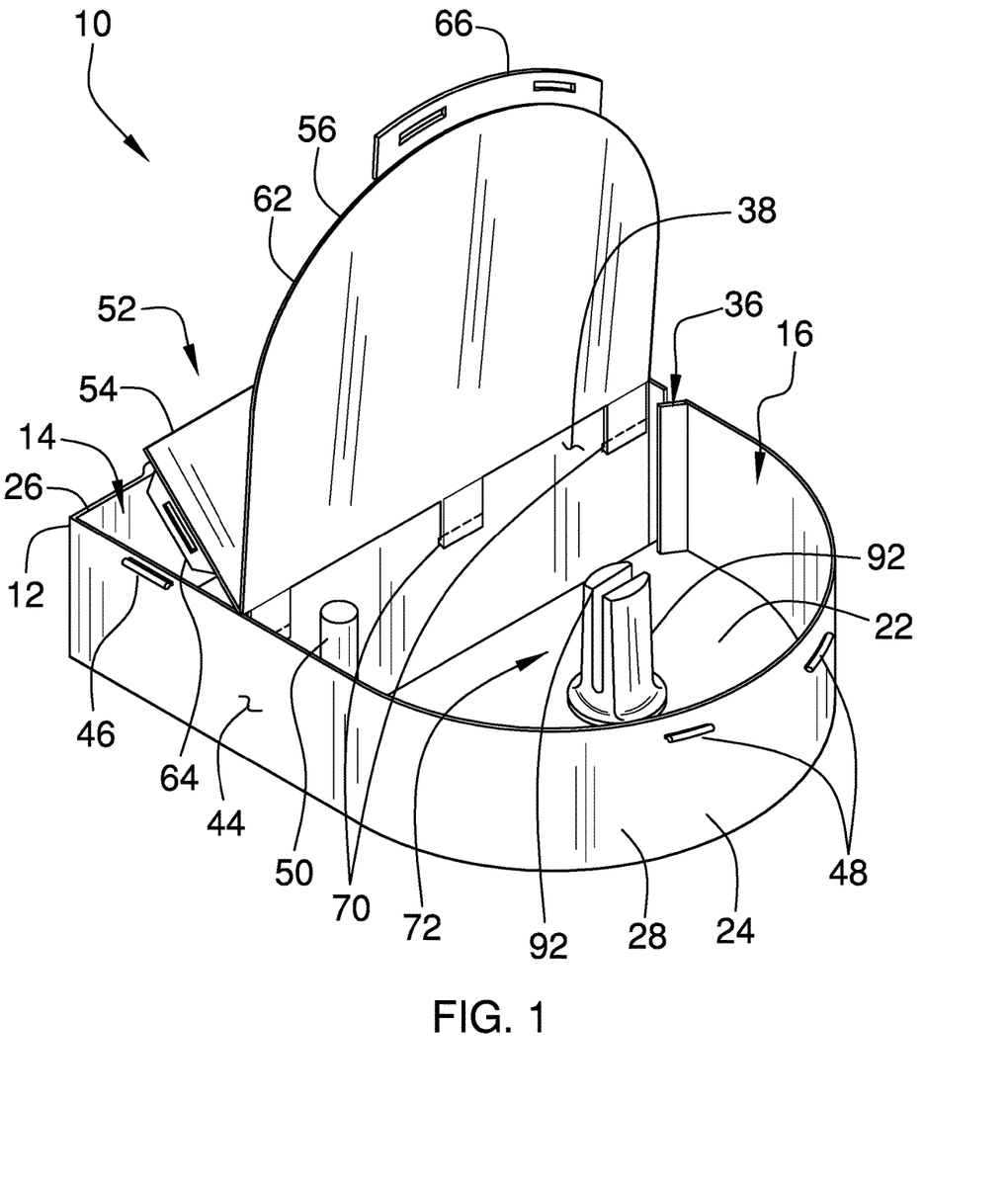
FIG. 1 is a top perspective view of a ratcheting strap storage assembly according to an embodiment of the disclosure.
Figure 2:
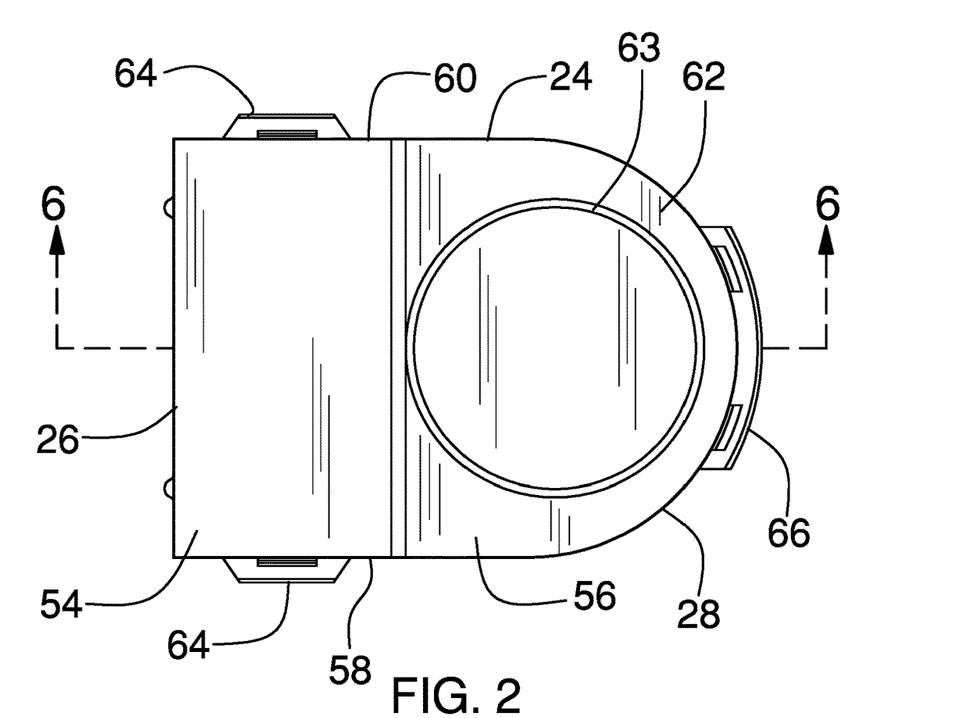
FIG. 2 is a top view of an embodiment of the disclosure.
Figure 3:
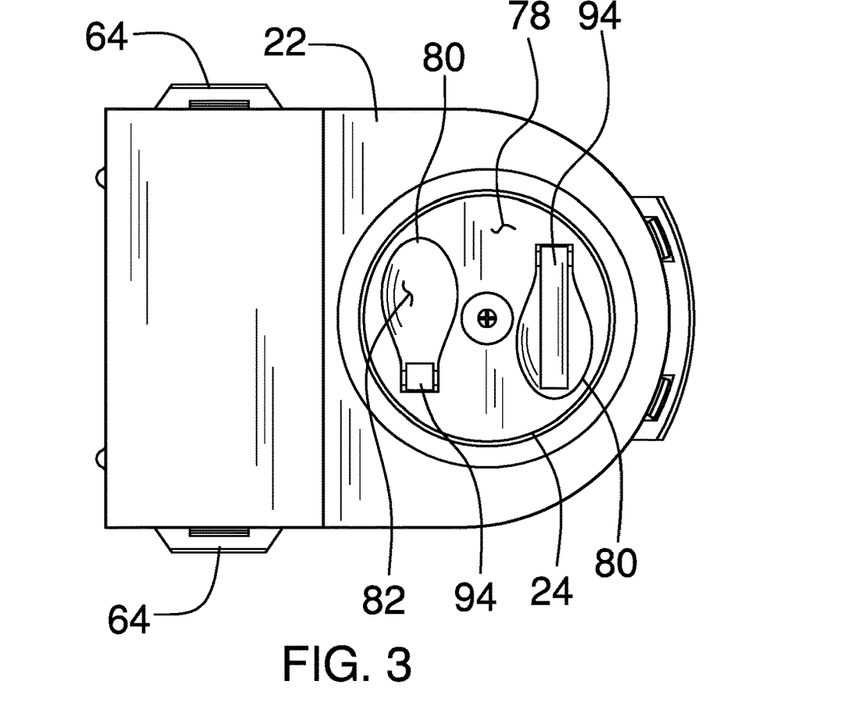
FIG. 3 is a bottom view of an embodiment of the disclosure.
Figure 4:
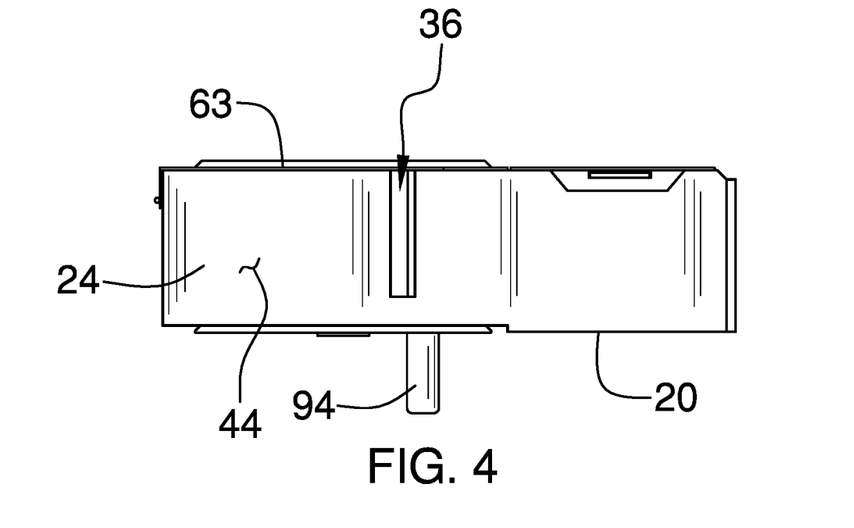
FIG. 4 is a left side view of an embodiment of the disclosure.
Figure 5:
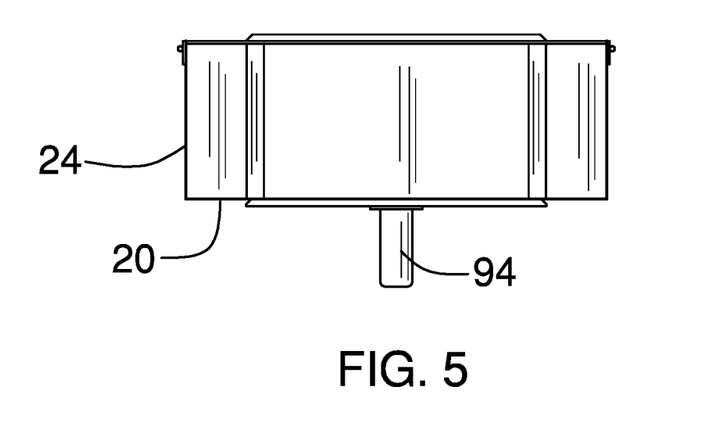
FIG. 5 is a back view of an embodiment of the disclosure.
Figure 6:
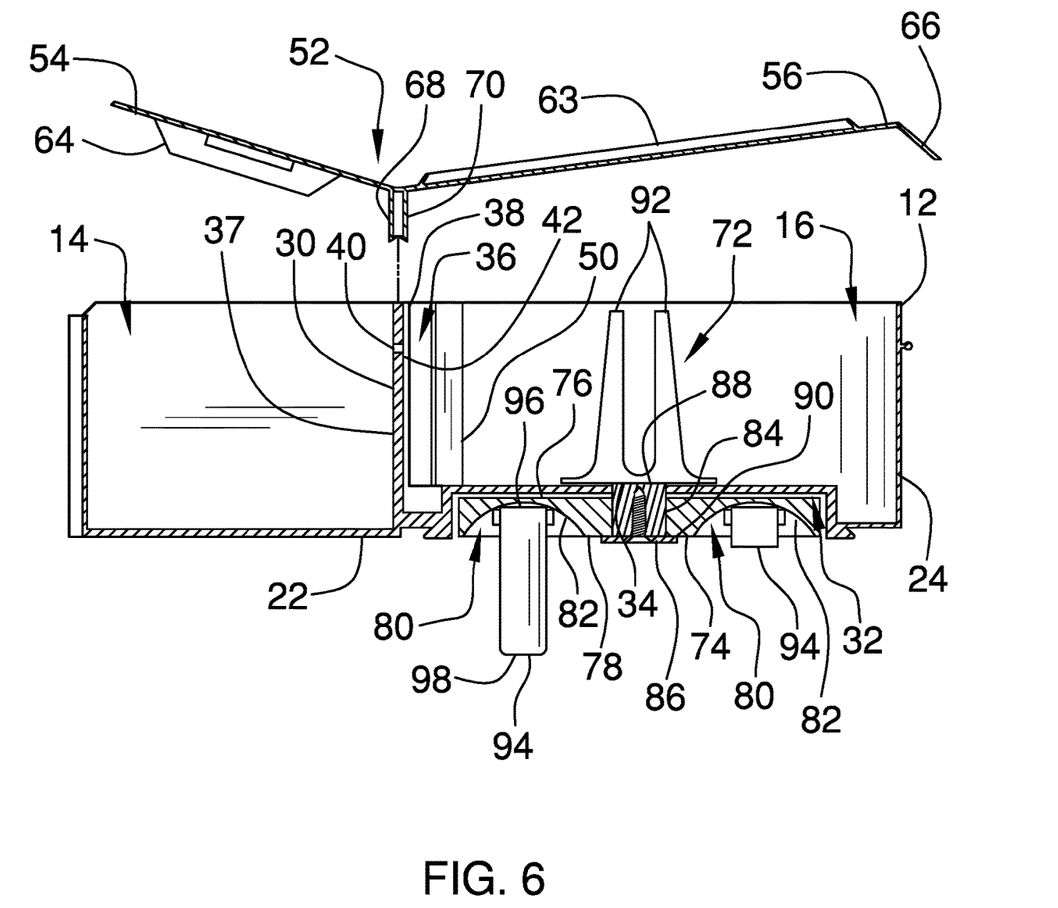
FIG. 6 is a cross sectional view taken along line 6-6 of FIG. 2 of an embodiment of the disclosure.
Figure 7A:
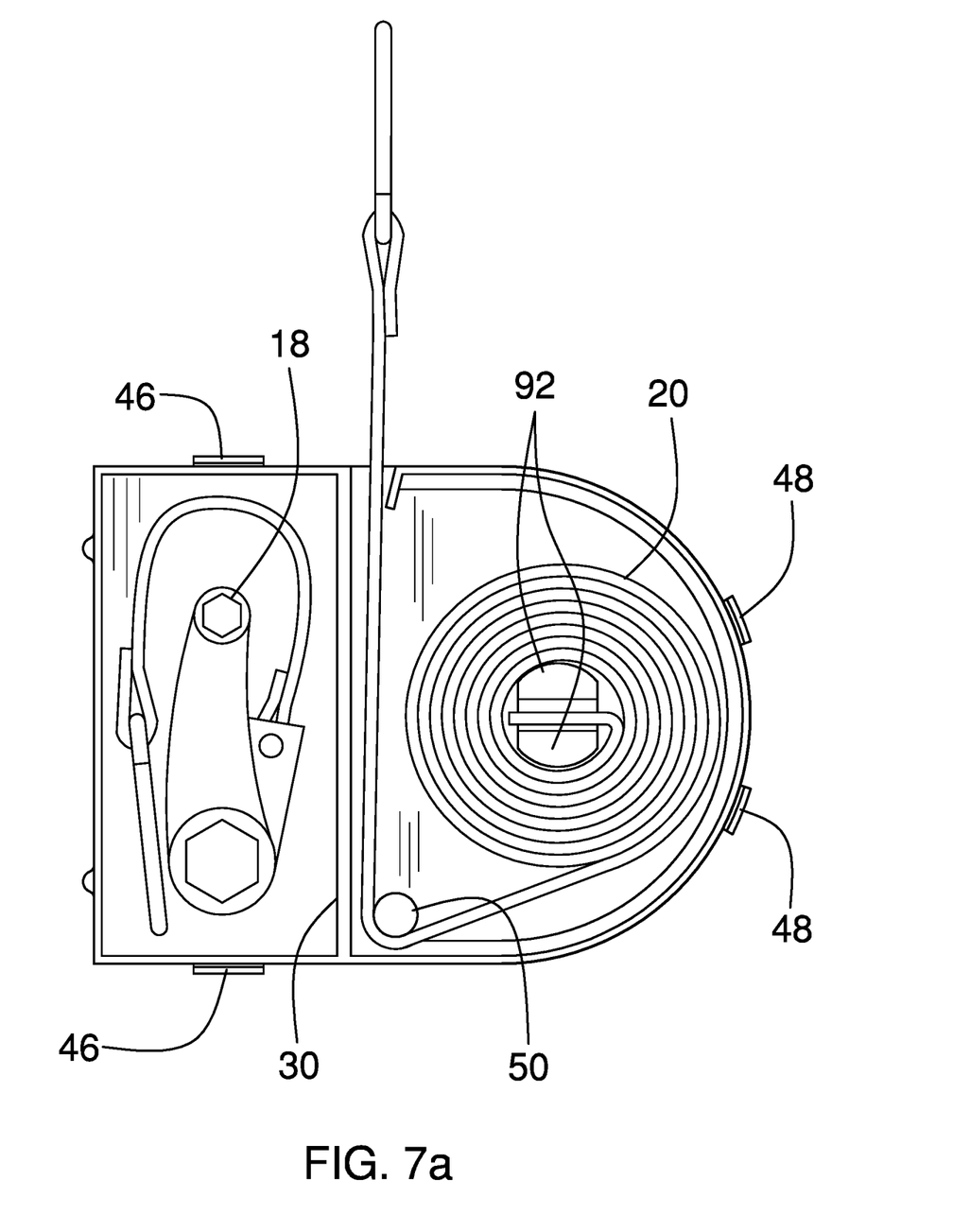
FIG. 7a is a top view of an embodiment of the disclosure showing a strap being coiled around a winding mechanism.
Figure 7B:
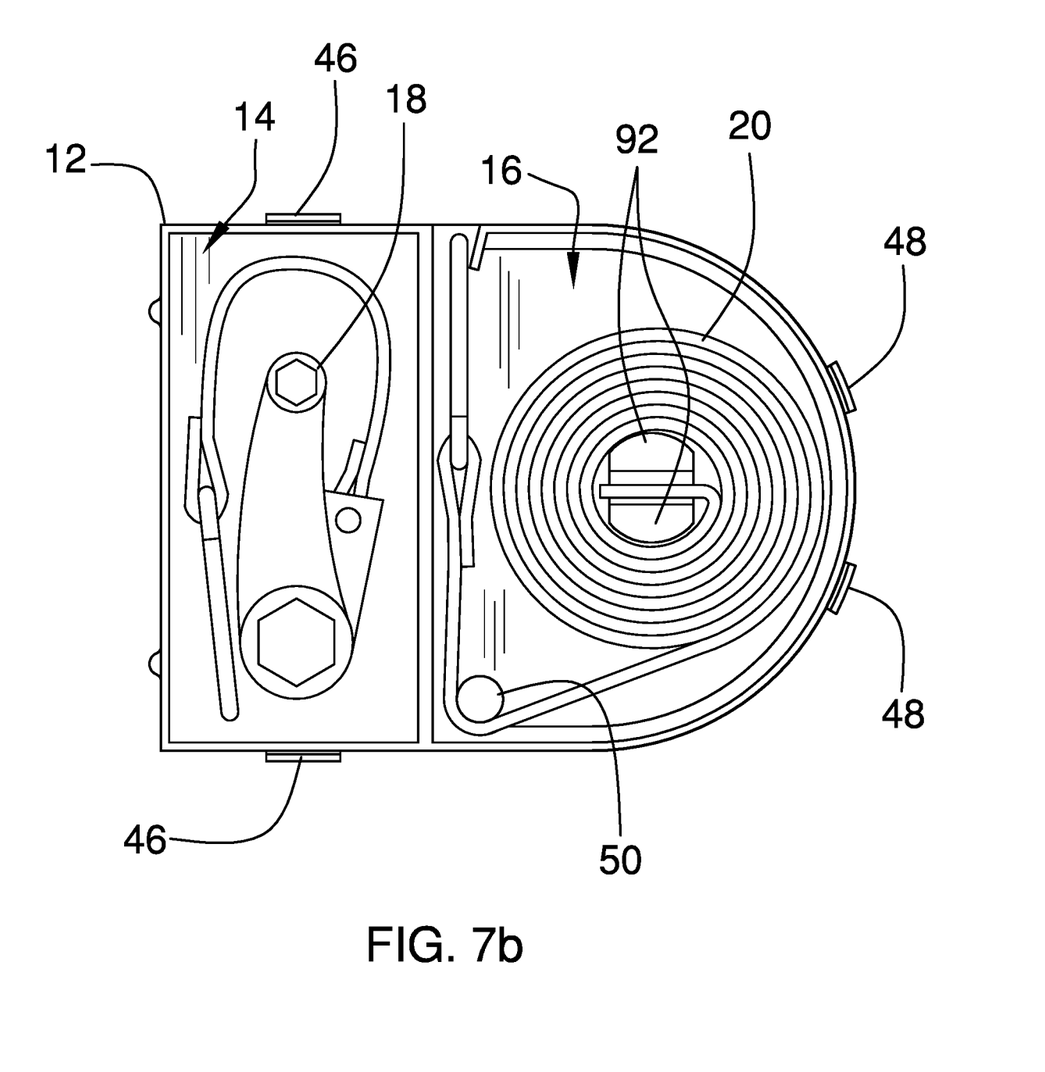
FIG. 7b is a top view of an embodiment of the disclosure showing a strap being stored in a second compartment.

With reference now to the drawings, and in particular to FIGS. 1 through 7b thereof, a new storage device embodying the principles and concepts of an embodiment of the disclosure and generally designated by the reference numeral 10 will be described.

As best illustrated in FIGS. 1 through 7b, the ratcheting strap storage assembly 10 generally comprises a box 12 has a first compartment 14 and a second compartment 16. A ratcheting mechanism 18 of a ratcheting strap is positionable in the first compartment 14 for storage. Additionally, a strap 20 of the ratcheting strap is coiled within the second compartment 16 for storage. The box 12 may have a height ranging between approximately 2.0 inches and 3.0 inches, a length ranging between approximately 6.0 inches and 8.0 inches, and a width ranging between approximately 4.0 inches and 5.0 inches.

The box 12 has a basal wall 22 and a perimeter wall 24 extending upwardly therefrom. The perimeter wall 24 has a first side 26 and a second side 28; the first side 26 is straight and the second side 28 is concavely arcuate with respect to the first side 26 such that the box 12 has a D-shape. The box 12 has a divider 30 positioned therein that extends laterally across opposite sides of the second side 28 of the perimeter wall 24 to define the first 14 and second 16 compartments. The first compartment 14 extends between the divider 30 and the first side 26, and the second compartment 16 extends between the divider 30 and the second side 28.

The basal wall 22 has a well 32 extending into the box 12 and the well 32 is aligned with the second compartment 16. The basal wall 22 has an aperture 34 extending into an interior of the box 12 and the aperture 34 is centrally positioned in the well 32. The second side 28 of the perimeter wall 24 of the box 12 has a slot 36 extending into the second compartment 16 and the strap 20 is passed through the slot 36. The divider 30 has a first surface 37 and a second surface 38. The first surface 37 has a plurality of first engagements 40 positioned thereon and the first engagements 40 are spaced apart from each other and are distributed along the divider 30. The second surface 38 has a plurality of second engagements 42 positioned thereon and the second engagements 42 are spaced apart from each other and are distributed along the divider 30.

The perimeter wall 24 has an outer surface 44 and the outer surface 44 of the second side 28 of the perimeter wall 24 has a pair of third engagements 46 is positioned thereon.

The third engagements 46 are positioned on opposite sides of the second side 28 with respect to each other. The outer surface 44 of the second side 28 of the perimeter wall 24 has a plurality of fourth engagements 48 positioned thereon and each of the fourth engagements 48 is positioned on opposite sides of an apex of the second side 28. A peg 50 is coupled to and extends upwardly from the basal wall 22 and the peg 50 is positioned in the second compartment 16. The peg 50 is aligned with the slot 36 in the second side and the peg 50 is positioned on an opposite side of the second side 28 with respect to the slot 36. Moreover, the strap 20 is wrapped the peg 50 after the strap 20 is passed through the slot 36 in the perimeter wall 24 of the box 12.

A pair of lids 52 is each hingedly coupled together and each of the lids 52 is removably coupled to the box 12 for closing the box 12. The pair of lids 52 includes a first lid 54 and a second lid 56. The first lid 54 is positioned over the first compartment 14 and the second lid 56 is positioned over the second compartment 16. The first lid 54 has a first lateral edge 58 and a second lateral edge 60, and the second lid 56 has a primary edge 62 that is concavely arcuate with respect to an intersection between the first 54 and second 56 lids. The second lid 56 has a raised portion 63 thereon and a perimeter of the raised portion 63 is continuously arcuate such that the raised portion 63 has a circular shape.

A pair of first flaps 64 is each bendably coupled to the first lid 54 and each of the first flaps 64 is positioned on a respective one of the first 58 and second 60 lateral edges of the first lid 54. Each of the first flaps 64 releasably engages a respective one of the third engagements 46 on the second side 28 of the perimeter wall 24 of the box 12 when the first lid 54 is positioned in a closed position for retaining the first lid 54 in the closed position. A second flap 66 is bendably coupled to the second lid 56 and the second flap 66 is positioned on an apex of the second lid 56. The second flap 66 releasably engages each of the fourth engagements 48 on the second side 28 of the perimeter wall 24 of the box 12 when the second lid 56 is positioned in a closed position for retaining the second lid 56 in the closed position.

A set of first grips 68 is coupled to and extends downwardly from an intersection between the first 54 and second 56 lids. Each of the first grips 68 releasably engages a respective one of the first engagements 40 on the divider 30 for retaining the first 54 and second 56 lids on the divider 30. A set of second grips 70 is each coupled to and extends downwardly from the intersection between the first 54 and second 56 lids. Each of the second grips 70 releasably engages a respective one of the second engagements 42 on the divider 30 for retaining the first 54 and second 56 lids on the divider 30. Additionally, each of the second grips 70 is spaced apart from and is aligned with a respective one of the first grips 68.

A winding mechanism 72 is rotatably coupled to the box 12 and the strap 20 of the ratcheting strap is coupled to the winding mechanism 72 after the strap 20 is extended through the slot 36 in the perimeter wall 24 of the box 12 and wrapped around the peg 50. The winding mechanism 72 is rotatable in a winding direction or an unwinding direction. The winding mechanism 72 wraps the strap 20 therearound when the winding mechanism 72 is rotated in the winding direction to coil the strap 20 within the second compartment 16 for storage. Additionally, the winding mechanism 72 unwinds the strap 20 when the winding mechanism 72 is rotated in the unwinding direction to release the strap 20 from the box 12.

The winding mechanism 72 comprises a disk 74 that has a first surface 76 and a second surface 78, and the second surface 78 has a pair of depressions 80 each extending toward the first surface 76. Each of the depressions 80 has a bounding surface 82 and the bounding surface 82 of each of the depressions 80 is concavely arcuate with respect to the second surface 78 of the disk 74. Moreover, each of the depressions 80 extends away from a center of the disk 74 in opposite directions from each other. The disk 74 is positioned in the well 32 in the basal wall 22 having the second surface 78 of the disk 74 being aligned with the basal wall 22.

The winding mechanism 72 includes a retainer 84 that has a first end 86 and a second end 88. The retainer 84 extends through the disk 74 and passes through the aperture 34 in the basal wall 22 such that the disk 74 is rotatably coupled to the basal wall 22. The retainer 84 has a lip 90 extending laterally away therefrom and the lip 90 is aligned with the first end 86. The lip 90 engages the second surface 78 of the disk 74 to inhibit the retainer 84 from passing upwardly through the disk 74.

The winding mechanism 72 further includes a pair of fingers 92 and each of the fingers 92 is coupled to and extends upwardly from the second end 88 of the retainer 84 such that each of the fingers 92 is positioned in the second compartment 16 of the box 12. The fingers 92 are spaced apart from each other and each of the fingers 92 flares outwardly at the intersection between the fingers 92 and the second end 88 of the retainer 84. Thus, the fingers 92 are inhibited from passing downwardly through the basal wall 22 of the box 12. The strap 20 of the ratcheting strap is positioned between the fingers 92 after the strap 20 is extended through the slot 36 in the perimeter wall 24 of the box 12 and wrapped around the peg 50. Thus, the strap 20 is urged through the slot 36 in the perimeter wall 24 of the box 12 and travels around the peg 50 to subsequently be wrapped around each of the fingers 92 when the winding mechanism 72 is rotated in the winding direction.

A pair of levers 94 is provided and each of the levers 94 has a coupled end 96 and a free end 98. The coupled end 96 of each of the levers 94 is pivotally coupled to the bounding surface 82 of a respective one of the depressions 80 in the second surface of the disk 74. Additionally, each of the levers 94 is positionable between a deployed position and a stored position. A selected one of the levers 94 is gripped when the selected lever 94 is positioned in the deployed position for rotating the winding mechanism 72 in the winding direction or the unwinding direction. Moreover, each of the levers 94 is positioned in the respective depressions 80 when the levers 94 are positioned in the stored position.

In use, the first lid 54 is opened and the ratcheting mechanism 18 of the ratcheting strap is positioned in the first compartment 14 for storage. The second lid 56 is opened and the strap 20 of the ratcheting strap is extended through the slot 36 in the perimeter wall 24 of the box 12, wrapped around the peg 50 and positioned between each of the fingers 92. A selected one of the levers 94 is positioned in the deployed position and the selected lever 94 is gripped for rotating the disk 74. Thus, the strap 20 is wrapped into a coil around each of the fingers 92 for storing the strap 20 in the second compartment 16. In this way the ratcheting mechanism 18 and the strap 20 can be conveniently stored and inhibited from becoming tangled. Each of the first 54 and second 56 lids are closed for retaining the ratcheting mechanism 18 and the strap 20 in the box 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A ratcheting strap storage assembly being configured to roll up and subsequently store a ratcheting strap, said assembly comprising:
    a box having a first compartment and a second compartment, said first compartment being configured to contain a ratcheting mechanism of a ratcheting strap for storage, said second compartment being configured to have a strap of the ratcheting strap being coiled therein for storage;
    a pair of lids, each of said lids being hingedly coupled together, each of said lids being removably coupled to said box for closing said box, said pair of lids including a first lid and a second lid, said first lid being positioned over said first compartment, said second lid being positioned over said second compartment;
    a winding mechanism being rotatably coupled to said box wherein said winding mechanism is configured to have the strap of the ratcheting strap being coupled thereto, said winding mechanism being rotatable in a winding direction or an unwinding direction, said winding mechanism wrapping the strap therearound when said winding mechanism is rotated in said winding direction wherein said winding mechanism is configured to coil the strap within said second compartment for storage, said winding mechanism unwinding the strap when said winding mechanism is rotated in said unwinding direction wherein said winding mechanism is configured to release the strap from said box;
    said box has a basal wall and a perimeter wall extending upwardly therefrom, said perimeter wall having a first side and a second side, said first side being straight, said second side being concavely arcuate with respect to said first side such that said box has a D-shape;
    said box has a divider being positioned therein and extending laterally across opposite sides of said second side of said perimeter wall to define said first and second compartments, said first compartment extending between said divider and said first side, said second compartment extending between said divider and said second side;
    said basal wall having a well extending into said box, said well being aligned with said second compartment;
    said basal wall has an aperture extending into an interior of said box, said aperture being centrally positioned in said well; and
    said second side has a slot extending into said second compartment wherein said slot is configured to have the strap passed therethrough.

2. The assembly according to claim 1, wherein said divider has a first surface and a second surface, said first surface having a plurality of first engagements being positioned thereon, said first engagements being spaced apart from each other and being distributed along said divider, said second surface having a plurality of second engagements being positioned thereon, said second engagements being spaced apart from each other and being distributed along said divider.

3. The assembly according to claim 2, wherein said perimeter wall has an outer surface, said outer surface of said second side of said perimeter wall having a pair of third engagements being positioned thereon, said third engagements being positioned on opposite sides of said second side with respect to each other, said outer surface of said second side of said perimeter wall having a plurality of fourth engagements being positioned thereon, each of said fourth engagements being positioned on opposite sides of an apex of said second side.

4. The assembly according to claim 3, further comprising:
    said first lid having a first lateral edge and a second lateral edge, said second lid having a primary edge being concavely arcuate with respect to an intersection between said first and second lids;
    a pair of first flaps, each of said first flaps being bendably coupled to said first lid, each of said first flaps being positioned on a respective one of said first and second lateral edges of said first lid, each of said first flaps releasably engaging a respective one of said third engagements on said second side of said perimeter wall of said box when said first lid is positioned in a closed position for retaining said first lid in said closed position; and
    a second flap, said second flap being bendably coupled to said second lid, said second flap being positioned on an apex of said second lid, said second flap releasably engaging each of said fourth engagements on said second side of said perimeter wall of said box when said second lid is positioned in a closed position for retaining said second lid in said closed position.

5. The assembly according to claim 4, further comprising:
    a set of first grips, each of said first grips being coupled to and extending downwardly from an intersection between said first and second lids, each of said first grips releasably engaging a respective one of said first engagements on said divider for retaining said first and second lids on said divider; and
    a set of second grips, each of said second grips being coupled to and extending downwardly from said intersection between said first and second lids, each of said second grips releasably engaging a respective one of said second engagements on said divider for retaining said first and second lids on said divider, each of said second grips being spaced apart from and being aligned with a respective one of said first grips.

6. The assembly according to claim 1, further comprising a peg being coupled to and extending upwardly from said basal wall, said peg being positioned in said second compartment, said peg being aligned with and being positioned on an opposite side of said second side with respect to said slot in said second side wherein said peg is configured to have the strap being wrapped therearound.

7. The assembly according to claim 1, wherein said winding mechanism comprises a disk having a first surface and a second surface, said second surface having a pair of depressions therein each extending toward said first surface, each of said depressions having a bounding surface, said bounding surface of each of said depressions being concavely arcuate with respect to said second surface, each of said depressions extending away from a center of said disk in opposite directions from each other, said disk being positioned in said well in said basal wall having said second surface being aligned with said basal wall.

8. The assembly according to claim 7, further comprising a retainer having a first end and a second end, said retainer extending through said disk and passing through said aperture in said basal wall such that said disk is rotatably coupled to said basal wall, said retainer having a lip extending laterally away therefrom, said lip being aligned with said first end, said lip engaging said second surface of said disk to inhibit said retainer from passing upwardly through said disk.

9. The assembly according to claim 8, further comprising a pair of fingers, each of said fingers being coupled to and extending upwardly from said second end of said retainer such that each of said fingers is positioned in said second compartment of said box, said fingers being spaced apart from each other, each of said fingers having the strap of the ratcheting strap being positioned therebetween thereby facilitating the strap to be urged through said slot in said perimeter wall of said box and travelling around a peg to subsequently be wrapped around each of said fingers when said winding mechanism is rotated in said winding direction.

10. The assembly according to claim 9, further comprising a pair of levers, each of said levers having a coupled end and a free end, said coupled end of each of said levers being pivotally coupled to said bounding surface of a respective one of said depressions in said second surface of said disk, each of said levers being positionable between a deployed position and a stored position, a selected one of said levers being gripped when said selected lever is positioned in said deployed position for rotating said winding mechanism in said winding direction or said unwinding direction, each of said levers being positioned in said respective depressions when said levers are positioned in said stored position.

11. A ratcheting strap storage assembly being configured to roll up and subsequently store a ratcheting strap, said assembly comprising:
- a box having a first compartment and a second compartment, said first compartment being configured to contain a ratcheting mechanism of a ratcheting strap for storage, said second compartment being configured to have a strap of the ratcheting strap being coiled therein for storage, said box having a basal wall and a perimeter wall extending upwardly therefrom, said perimeter wall having a first side and a second side, said first side being straight, said second side being concavely arcuate with respect to said first side such that said box has a D-shape, said box having a divider being positioned therein and extending laterally across opposite sides of said second side of said perimeter wall to define said first and second compartments, said first compartment extending between said divider and said first side, said second compartment extending between said divider and said second side, said basal wall having a well extending into said box, said well being aligned with said second compartment, said basal wall having an aperture extending into an interior of said box, said aperture being centrally positioned in said well, said second side having a slot extending into said second compartment wherein said slot is configured to have the strap passed therethrough, said divider having a first surface and a second surface, said first surface having a plurality of first engagements being positioned thereon, said first engagements being spaced apart from each other and being distributed along said divider, said second surface having a plurality of second engagements being positioned thereon, said second engagements being spaced apart from each other and being distributed along said divider, said perimeter wall having an outer surface, said outer surface of said second side of said perimeter wall having a pair of third engagements being positioned thereon, said third engagements being positioned on opposite sides of said second side with respect to each other, said outer surface of said second side of said perimeter wall having a plurality of fourth engagements being positioned thereon, each of said fourth engagements being positioned on opposite sides of an apex of said second side;
- a peg being coupled to and extending upwardly from said basal wall, said peg being positioned in said second compartment, said peg being aligned with and being positioned on an opposite side of said second side with respect to said slot in said second side wherein said peg is configured to have the strap being wrapped therearound;
- a pair of lids, each of said lids being hingedly coupled together, each of said lids being removably coupled to said box for closing said box, said pair of lids including a first lid and a second lid, said first lid being positioned over said first compartment, said second lid being positioned over said second compartment, said first lid having a first lateral edge and a second lateral edge, said second lid having a primary edge being concavely arcuate with respect to an intersection between said first and second lids;
- a pair of first flaps, each of said first flaps being bendably coupled to said first lid, each of said first flaps being positioned on a respective one of said first and second lateral edges of said first lid, each of said first flaps releasably engaging a respective one of said third engagements on said second side of said perimeter wall of said box when said first lid is positioned in a closed position for retaining said first lid in said closed position;
- a second flap, said second flap being bendably coupled to said second lid, said second flap being positioned on an apex of said second lid, said second flap releasably engaging each of said fourth engagements on said second side of said perimeter wall of said box when said second lid is positioned in a closed position for retaining said second lid in said closed position;
- a set of first grips, each of said first grips being coupled to and extending downwardly from an intersection between said first and second lids, each of said first grips releasably engaging a respective one of said first engagements on said divider for retaining said first and second lids on said divider;
- a set of second grips, each of said second grips being coupled to and extending downwardly from said intersection between said first and second lids, each of said second grips releasably engaging a respective one of said second engagements on said divider for retaining said first and second lids on said divider, each of said second grips being spaced apart from and being aligned with a respective one of said first grips; and a winding mechanism being rotatably coupled to said box wherein said winding mechanism is configured to have the strap of the ratcheting strap being coupled thereto, said winding mechanism being rotatable in a winding direction or an unwinding direction, said winding mechanism wrapping the strap therearound when said winding mechanism is rotated in said winding direction wherein said winding mechanism is configured to coil the strap within said second compartment for storage, said winding mechanism unwinding the strap when said winding mechanism is rotated in said unwinding direction wherein said winding mechanism is configured to release the strap from said box, said winding mechanism comprising:

a disk having a first surface and a second surface, said second surface having a pair of depressions therein each extending toward said first surface, each of said depressions having a bounding surface, said bounding surface of each of said depressions being concavely arcuate with respect to said second surface, each of said depressions extending away from a center of said disk in opposite directions from each other, said disk being positioned in said well in said basal wall having said second surface being aligned with said basal wall;

a retainer having a first end and a second end, said retainer extending through said disk and passing through said aperture in said basal wall such that said disk is rotatably coupled to said basal wall, said retainer having a lip extending laterally away therefrom, said lip being aligned with said first end, said lip engaging said second surface of said disk to inhibit said retainer from passing upwardly through said disk;

a pair of fingers, each of said fingers being coupled to and extending upwardly from said second end of said retainer such that each of said fingers is positioned in said second compartment of said box, said fingers being spaced apart from each other, each of said fingers having the strap of the ratcheting strap being positioned therebetween thereby facilitating the strap to be urged through said slot in said perimeter wall of said box and travelling around said peg to subsequently be wrapped around each of said fingers when said winding mechanism is rotated in said winding direction; and a pair of levers, each of said levers having a coupled end and a free end, said coupled end of each of said levers being pivotally coupled to said bounding surface of a respective one of said depressions in said second surface of said disk, each of said levers being positionable between a deployed position and a stored position, a selected one of said levers being gripped when said selected lever is positioned in said deployed position for rotating said winding mechanism in said winding direction or said unwinding direction, each of said levers being positioned in said respective depressions when said levers are positioned in said stored position.

\* \* \* \* \*